United States Patent [19]

Ryan

[11] 4,331,980
[45] May 25, 1982

[54] CIRCUIT AND METHOD FOR AUTOMATICALLY SETTING THE BEAM CURRENTS IN A VIDEO CAMERA

[75] Inventor: John O. Ryan, Cupertino, Calif.

[73] Assignee: Ampex Corporation, Redwood City, Calif.

[21] Appl. No.: 185,097

[22] Filed: Sep. 8, 1980

[51] Int. Cl.³ .............................................. H04N 5/34
[52] U.S. Cl. ..................................... 358/217; 358/219
[58] Field of Search ...................... 358/217, 219, 243; 315/386

[56] References Cited

U.S. PATENT DOCUMENTS 3,006,994 10/1961 Spiegal ................................ 358/219

Primary Examiner—Robert L. Richardson
Attorney, Agent, or Firm—George B. Almeida; Joel B. Talcott

[57] ABSTRACT

The conventional vertical drive sawtooth is modified, during the camera setup mode, to halve the slope thereof for a given field time interval, or intervals, and to double the slope for the remaining field time interval. It follows that the speed of vertical scan is halved and doubled respectively, in the corresponding field time intervals. In the interval of double scan speed, blooming occurs and twice the usual beam current is required to successfully discharge the picture. Thus when the beam set circuit is in operation as during the setup mode, the beam current is increased until the blooming existing in the double scan speed interval just subsides. The beam current has then been set at 200% of typical beam level.

15 Claims, 4 Drawing Figures

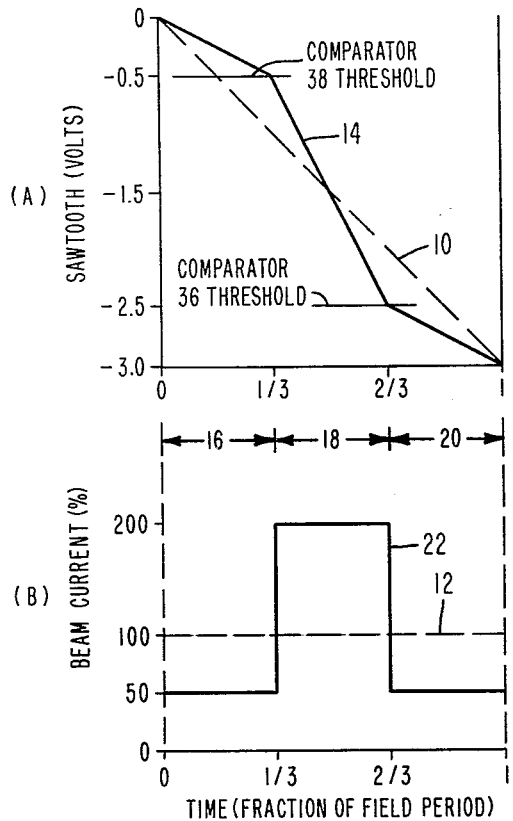
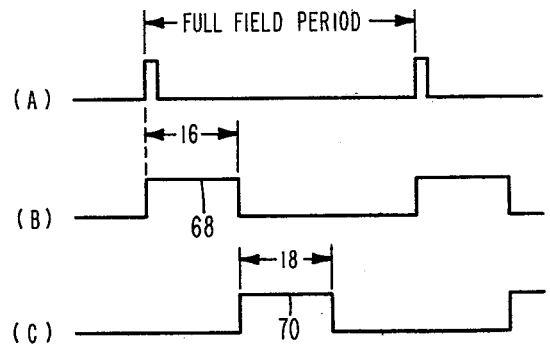
FIG_1
FIG_4
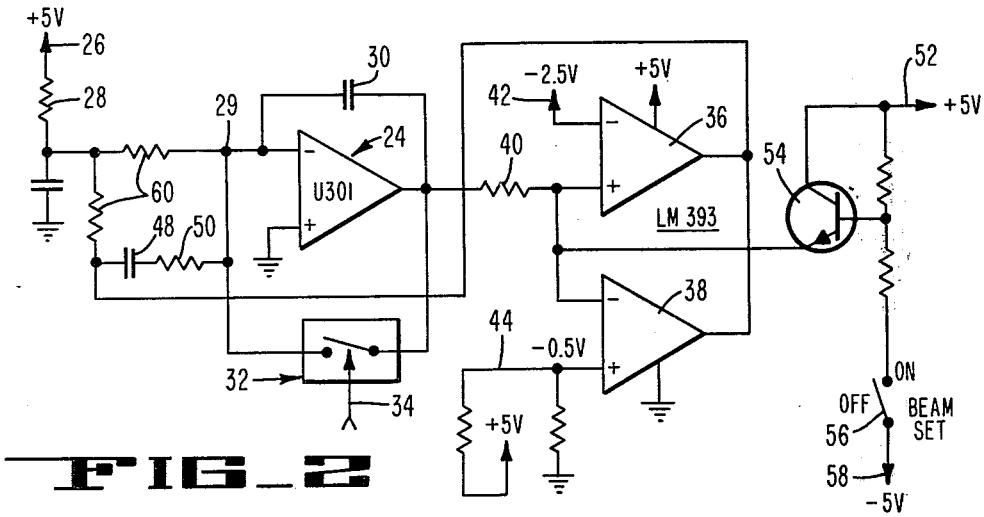
FIG_2
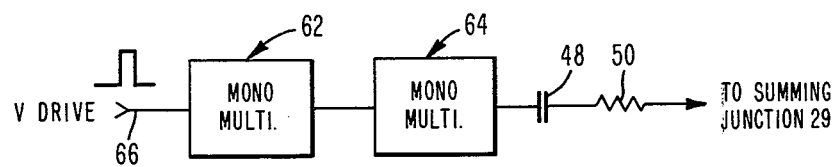
FIG_3

CIRCUIT AND METHOD FOR AUTOMATICALLY SETTING THE BEAM CURRENTS IN A VIDEO CAMERA

CROSS REFERENCE TO RELATED APPLICATIONS

A Two Dimensional Interpolation Circuit for Spatial and Shading Error Corrector Systems, Ser. No. 139,512, filed Apr. 11, 1980, to John O. Ryan et al.

Digital Error Measuring Circuit for Shading and Registration Errors in Television Cameras, Ser. No. 139,604, filed Apr. 11, 1980, to K. H. Griesshaber.

BACKGROUND OF THE INVENTION

The invention is related to means for setting the beam currents in video cameras, and particularly to a method and simple circuit thereof for automatically setting the beam current of a pickup tube to a greater value, i.e., 200% of typical, which precludes blooming in the presence of highlights of up to twice the usual level.

Typically, a pickup tube such as a plumbicon (trademark of N. V. Philips), Saticon (trademark of Hitachi Denshi, Ltd.), etc., is operated at 300 nanoamps (nA) of beam signal current in the green channel. Video camera manufacturers generally set the beam current of such a tube at a value 100% larger, or 600 nA, whereby the tube can handle up to twice as much light in a scene without experiencing the picture wash-out effect known as "blooming". On the other hand, setting the beam current to a value which is too high will cause defocussing effects.

Thus, to achieve the proper beam current setting, a typical prior art approach used in manual cameras during the setup procedure, is to open the iris of the camera to obtain 100% picture, with the gain of the respective channel set to normal. The f/stop number of the iris is then opened one f/stop larger, which guarantees twice the amount of incoming light. Then the beam current is adjusted whereby the tube just handles the doubled amount of light. The beam current is then set at 200% of the typical beam current.

A further approach for setting the beam current in the manual setup of a camera is to adjust the normal gain of the channel to a −6 dh gain, i.e., exactly halve the normal gain of the channel. The iris is then opened to provide 100% of the output. Since the gain has been halved, there is 200% incoming light to the tube. Now the beam current is readjusted such that there is no blooming effect, whereby the beam current thus is set at 200% of the typical level.

Such techniques may be employed in the manual setup of a camera, where the iris control, etc., is available. However, the techniques are impractical for use with video cameras having sophisticated automatic setup systems, particularly in systems employing a diascope test pattern for automatic setup. In such systems, there presently is no practical way for providing 200% of incoming light to the tube. An iris may be built into the diascope, whereby the automatic setup system may open the iris by one f/stop in the course of setting the associated beam. Or the system may include a 2 to 1 reduction filter which might be switched out by the automatic setup system to double the light intensity. However, such systems are mechanical, relatively complicated and correspondingly expensive to implement.

Another approach may be to fabricate the diascope pattern with only 50% transparency, with a few sections in it with 100% transparency. Thus, with 100% of light passing through the diascope, the few sections would pass 200% of light, which then may be used by the automatic setup system to provide a 200% beam setting. This technique is difficult to apply in practice because of the difficulty of making the diascope with the required transparencies.

SUMMARY OF THE INVENTION

The invention generally overcomes the problems and disadvantages of the above-mentioned prior art techniques for selectively setting the beam currents in pickup tubes of a video camera, while providing an extremely simple technique employing an equally simple circuit formed of a few resistor, capacitor, amplifier, etc., components. The circuit is readily added to an automatic setup system of a portable camera to provide automatic, as well as manual, adjustment of the beam setting.

It is well known that the signal current of a pickup tube, such as a Plumbicon, is a function of the time that the scan beam spends in a given area of the target. If the scan speed is increased by a given percentage in a given area, it must deposit correspondingly more electrons per unit time to successfully discharge that area of the target. It follows that a proportionately greater beam current of the same percentage is required to preclude the generation of blooming.

In utilizing the above conditions, the shape of the normal vertical drive sawtooth is changed by the beam set circuit, to double and halve the slope of the sawtooth waveform during selected portions of the vertical field time period. Thus, for example, for the first one-third interval of the field time period the slope of the sawtooth is made one-half the normal slope; for the next one-third interval of the field time period the slope is made twice normal; and for the last one-third interval the slope is again made one-half normal. Correspondingly, for the first and last one-third field time intervals, the beam scan speed is halved, but during the middle one-third interval the speed is doubled. Thus during the middle one-third interval, twice the beam current is required to successfully discharge the target to preclude blooming. However, the average current (over on scan) is the same as when using the normal sawtooth waveform. In order to double the beam current, the beam current is increased until that portion of the picture which is blooming, during the middle one-third field time interval, is just discharged. The beam setting is then at the desired 200% of the typical level.

To provide the modified sawtooth waveform, the conventional sawtooth generator circuit, formed of an operational amplifier configured as an integrator, is modified to also generate a modulating beam set pulse of selected low and high levels corresponding to the various one-third intervals of the full field time period. This pulse is AC coupled back to the integrator input to modulate the conventional sawtooth to generate therefrom the modified sawtooth of halved and doubled slopes. The modified sawtooth, in turn, doubles the speed of the beam scan during the middle one-third field time interval. If the beam current is adjusted to just discharge the blooming effect in the interval, the beam current is then set at the desirable 200% typical level.

BRIEF DESCRIPTION OF THE DRAWINGS

FIG. 1A, 1B is a graph comparing the conventional and modified sawtooth waveforms, and the AC coupled beam set pulse which provides the modified sawtooth.

FIG. 2 is a schematic diagram exemplifying one embodiment of the invention combination.

FIG. 3 is a schematic diagram of an alternate circuit for generating the AC coupled beam set pulses.

FIG. 4A, 4B, 4C is a graph depicting the waveforms generated at various points of the circuit of FIG. 3.

DESCRIPTION OF THE PREFERRED EMBODIMENTS

Referring to FIG. 1A, the conventional sawtooth waveform used to drive the vertical scan of a pickup tube electron beam during a full field time period, is depicted by the dashed curve and the numeral 10. The resulting typical constant signal current for the tube, of 100% for an evenly illuminated target, is depicted by the dashed curve 12 of FIG. 1B, also during a full field time period. As previously mentioned, the signal current from, for example, a Plumbicon pickup tube, is a function of the time that the beam scan spends in a given area of the target, i.e., of the picture. Thus, if the beam speed is increased in a given area, it must deposit a correspondingly greater number of electrons per unit time to successfully discharge the picture. In turn, a correspondingly larger beam current is required.

Thus, in FIG. 1A, the conventional sawtooth 10 is modified in accordance with the invention, to provide the modified sawtooth 14 of selectively changed slopes.

By way of example only, it is assumed that the desired beam setting for the specific example herein, is to be 200% of the typical beam level. However, it is understood that the beam setting provided by the invention technique could be other than 200%; e.g., 150%, 300%, etc. For example, in a 150% beam setting, the slope of the usual sawtooth is altered by 1½ to 1, and the beam set pulse 22 of FIG. 1B is set at the corresponding slopes.

Thus, the full field time period for the vertical scan is divided into a selected number of time intervals as, for example, the three one-third time intervals 16, 18, 20 of FIG. 1A, 1B. However, any proportion other than one-third of the full field time period may be used, wherein it is advantageous however to use a fair amount (e.g., at least 10%) of the period, because the system also may be used to manually set the beam current and a larger proportion of the field allows an operator to more readily locate the speeded-up portion of the scan.

The modified sawtooth 14 is generated via a modified version of a conventional sawtooth generator, i.e., basically an operational amplifier configured as an integrator, by AC coupling a beam set pulse 22 (FIG. 1B) back into the integrator input. The beam set pulse is set at a 50% beam current level for the first and third intervals 16, 20 respectively, and is set at a 200% level during the middle interval 18. Thus, over one scan, the effective net current is the same, as depicted by the fact that the area under the conventional 100% signal current curve 12 is the same as that under the beam set pulse 22. It may be seen that AC coupling the beam set pulse 22 to the integrator causes the slope of the first one-third field time interval, i.e., interval 16, to be one-half the normal slope, the middle interval 18 to be twice the normal slope, and the last one-third interval 20 to be one-half the normal slope. Thus, for the first and third intervals 16, 20, the velocity of the vertical scan is one-half its normal speed, but during the middle interval 18, it is twice the normal speed. It follows that twice as much beam current is required from the beam to successfully discharge the picture in the middle interval 18, which corresponds to the desired 200% beam setting.

Thus, during the camera setup mode of operation, when beam set is required, the camera is pointed at an object, the gain is set to unity, and the iris is opened to 100% of picture. The beam set circuit of description herein is turned on, which provides the modified sawtooth scan 14 of FIG. 1A, wherein accordingly during the middle field time interval 18 the tube experiences blooming across the corresponding center one-third of the picture. To compensate for the blooming, the tube must double its signal output in the corresponding center portion of the picture. However, the signal output doubles only if there is sufficient beam current available. Thus, the beam current is turned up by the operator until the blooming in the middle portion just subsides, i.e., when the middle interval 18 of the tube target is successfully discharged by the commensurate increase in beam current. The camera tube has then been automatically set for 200% beam current.

The actual setting of the beam current may be performed manually, or preferably automatically by an automatic setup system such as that described in the cross-referenced patent applications Ser. Nos. 139,512 and 139,604. That is, the correct amount of beam current may be cranked in by the operator, or by the automatic setup system, by "observing" either the blooming effect in the middle one-third of the picture, or the video signal level. In the first technique using the blooming effect, the operator or the automatic setup system monitors the blooming, i.e., the resulting expanded white patch in the picture, and increases the beam current until the white patch just returns to normal size.

In the technique using the video signal level, the operator, or the automatic setup system, monitors the video level as the beam current is increased. At the point where the video signal does not increase with a continuing increase in beam current, the proper (in this example 200%) beam current level has been achieved. However, in the latter technique, the increase in beam current may drive the video signal to a level which is prematurely clipped by the clipper circuit which usually is in the output stages of a camera. In this event, the true maximum video signal level could not be "observed". Thus, when using the latter technique, $-6$ db gain is added in the video channel to drop the video signal level into a range where it will not be clipped by the clipper circuits.

Referring now to FIG. 2, there is depicted an implementation of the invention combination for generating the beam set pulse 22 and thus the modified vertical sawtooth 14 of FIG. 1B, 1A respectively. The basic sawtooth generator, i.e., an operational amplifier configured as an integrator 24, is coupled at its minus input to a reference voltage at 26, via a resistor 28 and summing junction 29. The positive input to the integrator 24 is grounded. A capacitor 30 is coupled across the operational amplifier to provide the integrator 24. Reset means 32 is coupled across the capacitor 30 and resets the integrator 24, i.e., selectively discharges the capacitor 30 in response to a system vertical drive clock on an input line 34. If a horizontal scan version of the system is used, then a system horizontal drive clock is fed into line 34.

The integrator 24 is coupled at its output to the respective positive and negative inputs of a pair of differential comparators 36, 38 via a resistor 40. The comparators 36, 38 define a window discriminator, wherein each comparator selectively is biased to switch on at a given voltage threshold. The combined outputs provide an output pulse only when the sawtooth voltage from the integrator 24 is at a level between the two thresholds. To this end, the negative input of comparator 36 is coupled to a bias voltage at 42 of, for example, −2.5 volts, and the positive input of the comparator 38 is coupled to a bias voltage of 44 of, for example, −0.5 volts. The bias levels correspond to the thresholds of −0.5 and −2.5 volts respectively, shown in FIG. 1A. The comparators 36, 38 are coupled together and thence to the summing junction 28 of the integrator 24, via AC coupling means formed of a capacitor 48 and resistor 50. The comparator 36, 38 inputs are also coupled to a +5.0 volt voltage at 52 via an emitter follower 54 and a resistor.

A beam set on/off switch 56 is coupled to −5 volts at 58 and thence to the base of the emitter follower 54, and provides control means to switch the beam set circuit of the invention in and out of the automatic setup system. i.e., turns the beam set circuit on during the setup mode.

In operation, as long as the beam set on/off switch 56 is open, the base of the emitter follower 54 is high, and disables the window discriminator, i.e., comparators 36, 38, and prevents it from generating a beam set pulse by pulling the inputs to the comparators to a voltage level outside of the sawtooth thresholds (see FIG. 1A). When the switch 56 is closed, the base of the emitter follower 54 goes low, and the transistor thereof cuts off, and the window discriminator, and thus the beam set circuit of FIG. 2, is allowed to operate. The fixed positive voltage reference at 26 is applied to the integrator 24/capacitor 30, whereby the integrator generates a ramp voltage corresponding to the conventional sawtooth 10 of FIG. 1A as long as the reset means 32 is not in the circuit, as during the active vertical scan period. The reset means 32 is symbolized herein as a switch, and is activated during vertical blanking as via the system vertical drive signal 34, to discharge the capacitor 30, and thus to reset the integrator 24.

The pair of comparators 36, 38 switch on at the thresholds of previous mention to thus generate the beam set pulse 22 of FIG. 1B. The pulse levels go, for example, from 0 to +5 volts. The beam set pulse is AC coupled into the summing junction 29 and thence to the integrator input. The coupled pulse, in this example, goes from approximately −1.66 to +3.33 volts, with an average value of zero. While the pulse level is positive, it feeds more current into the summing junction, and while it is negative it takes current therefrom. The resistors 50, 60 determine the actual current values, since when the pulse is high, the current across the resistor 50 increases, and when the pulse is low the current decreases. Thus the conventional sawtooth 10 from the integrator 24 is modulated to provide the modified sawtooth 14. The width and magnitude of the beam set pulse 22 is selected in accordance with the percentage increase of beam current desired.

Referring to FIG. 3, there is shown an alternate circuit for generating the beam set pulse 22 of FIG. 1B. Thus, a pair of monostable multivibrators 62, 64 are coupled in series, with the multivibrator 62 being coupled via a line 66 to a system vertical drive clock corresponding to the clock on line 34. The clock pulses occur at the full field period as depicted in FIG. 4A and also in previous FIG. 1A, 1B. The multivibrator 62 is triggered by the clock pulse and generates a delay, and thus a pulse 68, FIG. 4B, of one-third the full field period, which delay corresponds to the first time interval 16 of FIG. 1A, 1B. Multivibrator 64 is triggered by the trailing edge of the pulse 68, and generates a delay and a pulse 70, FIG. 4C, of one-third the full field period, which delay corresponds to the middle one-third interval 18 of FIG. 1A, 1B. The pulses are of from zero to +5 volts and are supplied to the AC coupling means formed of capacitor 48/resistor 50, and thence to the summing junction 29 of previous mention in FIG. 2. Thus pulse 70 corresponds to the beam set pulse 22 of FIG. 1B, and is used to generate the modified sawtooth 14 of FIG. 1A. As in the previous description, the circuit may be used in a horizontal scan system, wherein a system horizontal drive clock is fed to line 66 and the monostable multivibrators 62, 64 generate delays of one-third of a horizontal line period.

I claim:

1. A circuit for automatically setting the beam current of a video camera pickup tube to preclude the generation of blooming in the presence of highlights, comprising;
    means for generating a sawtooth waveform for driving the beam;
    means for modifying the sawtooth to selectively increase the speed of scan over a given area of scan; and
    means for increasing the beam current to a given current level sufficient to successfully remove the blooming.

2. The circuit of claim 1 wherein;
    the means for generating includes integrator means coupled to a reference voltage; and
    the means for modifying includes pulse forming means coupled to the integrator means for generating a sawtooth modulating beam set pulse.

3. The circuit of claim 2 wherein the means for modifying further includes;
    AC coupling means for coupling the beam set pulse to the input of the integrator means.

4. The circuit of claim 3 wherein the means for modifying decreases the speed of scan over a further given area of scan to provide an average current equal to that of the sawtooth waveform.

5. The circuit of claim 4 further comprising;
    capacitor means integral with the integrator means; and
    reset means coupled to the capacitor means to reset the integrator means in response to a system scan clock.

6. The circuit of claim 5 wherein;
    the pulse forming means includes a pair of multivibrator means coupled in series and responsive to the system scan clock, with the output coupled to the AC coupling means.

7. The circuit of claim 6 wherein the system scan clock corresponds to a vertical drive clock and the multivibrator means generate respective delays corresponding to the given scan areas of decreased and increased scan speeds.

8. The circuit of claim 5 wherein;
    the pulse forming means includes a window discriminator circuit for providing a selected time window commensurate with the area of increased scan speed; and the resulting beam set pulse during the area of increased beam scan has a percentage value which corresponds to the percentage of beam current desired over the usual beam current.

9. The circuit of claim 8 wherein;

the window discriminator means includes a pair of differential comparators coupled at first inputs thereof to the integrator means with the second inputs thereof responsive to selected thresholds, and with the outputs thereof coupled to the AC coupling means.

10. The circuit of claim 9 further including;

circuit control means coupled to the differential comparators for enabling and disabling the latter.

11. A method for automatically setting the beam current of a pickup tube during the camera setup mode when the camera views an object, with the gain set to unity and the iris open for 100% of picture, comprising the steps of;

increasing by a selected percentage the speed of scan of the beam over a given area of the picture to produce a corresponding lack of sufficient electrons to discharge the picture; and increasing the beam current of the beam to provide sufficient electrons to just discharge the picture in the given area.

12. The method of claim 11 wherein the step of increasing the speed of scan includes the steps of;

providing a sawtooth waveform for driving the scan beam;

generating a beam set pulse of selected time duration commensurate with said given area; and modulating the sawtooth waveform via the beam set pulse to provide a modified sawtooth waveform.

13. The method of claim 12 wherein the step of modulating further includes the step of;

AC coupling the beam set pulse back to the sawtooth waveform.

14. The method of claim 13 further including the step of;

generating the beam set pulse over a selected time interval corresponding to the given area of a full field period in responsee to a system vertical drive clock.

15. The method of claim 14 further including the step of;

providing a time window commensurate with the selected time interval in response to selected thresholds on the sawtooth waveform.

* * * * *